United States Patent
Faldu et al.

(10) Patent No.: US 10,854,099 B2
(45) Date of Patent: Dec. 1, 2020

(54) ADAPTIVE LEARNING MACHINE FOR SCORE IMPROVEMENT AND PARTS THEREOF

(71) Applicant: Indiavidual Learning Pvt. Ltd., Mumbai (IN)

(72) Inventors: Keyur Faldu, Mumbai (IN); Aditi Avasthi, Mumbai (IN); Achint Thomas, Mumbai (IN)

(73) Assignee: INDIAVIDUAL LEARNING PVT. LTD., Mumbai (IN)

( * ) Notice: Subject to any disclaimer, the term of this patent is extended or adjusted under 35 U.S.C. 154(b) by 347 days.

(21) Appl. No.: 15/708,591

(22) Filed: Sep. 19, 2017

(65) Prior Publication Data
US 2018/0090023 A1 Mar. 29, 2018

Related U.S. Application Data

(60) Provisional application No. 62/401,571, filed on Sep. 29, 2016.

(51) Int. Cl.
| | |
|---|---|
| G09B 7/00 | (2006.01) |
| G09B 19/00 | (2006.01) |
| G09B 5/02 | (2006.01) |
| G06N 5/04 | (2006.01) |
| G06N 5/02 | (2006.01) |

(52) U.S. Cl.
CPC .............. *G09B 7/00* (2013.01); *G09B 5/02* (2013.01); *G09B 19/00* (2013.01); *G06N 5/027* (2013.01); *G06N 5/04* (2013.01)

(58) Field of Classification Search
CPC ........................................................ G09B 7/00
USPC ........................................................ 434/236
See application file for complete search history.

(56) References Cited

PUBLICATIONS

"Calibration Protocol for Scoring Student Work—A Part of the Assessment Toolkit," Rhode Island Department of Education & the National Center for the Improvement of Educational Assessment, Inc. (2012), 11 pages.

*Primary Examiner* — Kesha Frisby
(74) *Attorney, Agent, or Firm* — Maschoff Brennan

(57) ABSTRACT

The present invention provides a self-learning/adapting system and method that uses novel user-targeted behavioral interventions thereby allowing a user to continually improve her scoring ability by generating challenges and remedial spot recommendations at least based on user's previous attempts and based on a plurality of factors, including but not limited to knowledge or aptitude level of user, attitudinal, behavioral, and test-taking skill, thus allowing the user to continuously improve her score in a limited time frame.

15 Claims, 4 Drawing Sheets

A process flow diagram of an exemplary user interaction with the novel platform of the present invention A diagrammatic representation of an environment in which an existing system(s) may operate.

An exemplary System Architecture of the present invention

An exemplary Control Flow Diagram depicting capturing and processing of response entered by user

A process flow diagram of an exemplary user interaction with the novel platform of the present invention

ADAPTIVE LEARNING MACHINE FOR SCORE IMPROVEMENT AND PARTS THEREOF

CROSS REFERENCE TO RELATED APPLICATION

This application claims priority to U.S. Provisional Patent Application No. 62/401,571 filed Sep. 29, 2016, the entire content of which is incorporated herein by reference in its entirety.

FIELD

Embodiments of the present disclosure relate to a method and system for providing an adaptive learning machine, and more specifically, but not limited to a system and method for providing such an adaptive learning machine based on user interaction with such machine.

BACKGROUND

In today's education system, the student-to-teacher ratio is highly disproportionate and teachers are not able to effectively provide personalized, individual, attention to each and every student.

The general education system is focused only on examinations rather than training students for the future and really testing their knowledge. Because of this, students are forced to take tests that show only their retention powers, not their actual capacity or knowledge.

The drawbacks or flaws of examination system include:

At times it is a matter of chance that a student may be asked to answer the questions, which he expected and 'guessed' right and had prepared them in advance. The time is limited and there is little time for the student even to think and reflect upon the topic, he is to dwell upon at length.

Within a short compass of choice, students are expected to give a proof of their years of studies. Within a period of three hours only a student's entire range of knowledge and ability is assessed and judged.

At the same time each student learns and absorbs information at different rates and based on individual aptitude.

Also, the present education system doesn't necessarily focuses on originality: A 'good show' by a student in his paper may fetch him good marks in the examination, but that does not establish the student's original or genuine quality or ability.

It is often seen that some of the best students, who have put in sincere and honest efforts in connection with their studies throughout the year, fail to get success in the examination while the fullest and most undeserving wards, who do not pout in any sincere application to their studies come out with flying colors in the examination.

One of the disadvantage with this present scenario i.e. wherein teachers are unable to provide personalized attention for any given classroom/collection of students, it has been observed that learning material is provided to cater to only "average" category of student(s).

Therefore, very bright students do not reach their full potential and do not get sufficient opportunity to give an optimized performance based on their ability.

At the same time, due to learning material being directed to average students, the scholastically weaker students find it extremely difficult to compete with the rest of the students.

To overcome this problem, a number of online platforms have been provided in the existing art in order to cater to students at their individual pace of learning.

However, the currently available education and online learning platforms merely host academic and related content online, apparently with the intent of catering to wide variety of students but such online platforms simply leave it up to the users (students) to consume this content in an effective manner.

Some such known platforms may also host testing material which the students can practice on to test their understanding of the content material. Further, such known platforms may also provide static feedback as a mere measure of accuracy on the test questions.

For Example, Luca Anastasia Maria, "System and method for objective assessment of learning outcomes", Patent Application No: PCT/US2012/037849, Nov. 22, 2012, provides a system and method to assess learning outcomes. This system computes the learning outcome of students by comparing student response to a set of pre-defined assessment units, and based on how closely the student solutions match the assessment solution key.

Also, James Hillier, James Pulliam, Kevin Pulliam, Kathy Becker, Will Richards, "Computer systems for capturing student performance", Patent No: US20140087352 A1, Mar. 27, 2014, provides a system and method to capture student performance. James et. al assumes that student performance can be wholly assessed by monitoring whether the learning outcomes as specified by administrators are met. However, it does not take into account intrinsic student behaviors like student attitude or test-taking skills.

Further, Elizabeth Bagley, Pamela Nesbitt, "Creation of knowledge and content for a learning content management system", Patent No: US20050102322 A1, May 12, 2005, describes a system for the creation of knowledge and content for a learning content management system.

Elizabeth et. al specifically addresses the creation of knowledge bases without the addressing the need to assess the quality of those knowledge bases via testing users who operate on the created knowledge bases.

Also, Curtis Dell Allen, Brandt Christian Redd, James Russell Ivie, Mark Wolfgramm, Brady S. Isom, Jeffery R. Gammon, Bernd Helzer, Todd J. Hardman, Paul Bryon Smith, Jiaxin Jerry Gao, "Adaptive and individual learning with feedback for online courses", Patent No: US20080138788 A1, Jun. 12, 2008, describes a system for adaptive and individual learning with feedback. However, Curtis et al. merely looks at how students perform when answering questions based on some learning curriculum and therefore measures only academic knowledge, while failing to address student behavioral and test-taking skills.

Hence, existing platforms and systems as known in the art are not able to facilitate personalized learning at the user-level for any given concept in general, and any given competitive exam in particular.

Most current systems merely account for how well a student can match up to expected solutions to testing modules based on pre-defined scoring defined criteria.

However, current systems do not cater to all categories of users (students) and do not self-adapt based on user interaction thus allowing a user (students) to continuously improve their ability to perform in subsequent interactions.

Therefore, there is a long felt need for a system and method that is self-adapting and continually updating/learning based on user interaction.

Such a self-learning/adapting system and method shall allow a user to continually improve its ability to perform by generating challenges at least based on user's previous attempts and based on a plurality of factors, including but not limited to knowledge or aptitude level of user, attitudinal, behavioral, and test-taking skill, thus allowing the user to continuously improve in a limited time frame.

Such features are not proposed by the existing art due to lack of personalized learning tailored to each student. This results in a state wherein the student is not able to realize their maximum potential to score in any given competitive exam.

SUMMARY OF INVENTION

For purposes of summarizing, certain aspects, advantages, and novel features of the disclosure have been described herein. It is to be understood that not necessarily all such advantages may be achieved in accordance with any one particular embodiment of the disclosure. Thus, the present disclosure may be embodied or carried out in a manner that achieves or optimizes one advantage or group of advantages as taught herein without necessarily achieving other advantages as may be taught suggested herein.

The present invention provides for a method and system that allows a user to interact with a novel platform by collecting data signals at the platform.

In an embodiment, the present invention provides a hardware and software-based Calibration system and Feedback system wherein the feedback is presented to a user via an online browser thus improving users scoring ability.

The present invention embodies a Calibration system for the purpose of targeting behavioral interventions aimed at helping the user improve their score. Behavioral interventions are affected via the use of the Feedback system which presents spot recommendations delivering academic payloads to the user which are specific, granular, and action-oriented.

In an embodiment the present invention provides a method (and an apparatus) for optimizing learning ability of a machine, comprising by operating a client machine (202) to access challenges displayed to a user by the client machine (202), capturing a response of a user to a first such challenge, sending captured response to a plurality of application servers (206) hosting a platform (208) comprising of a feedback generator (207), wherein said platform (208) comprises a calibration module (209) and feature composer (210) such that feature composer (210) is configured to extract a plurality of predefined features from the captured response, send captured features to feedback generator (207) via a calibration module (209) and wherein output of feedback generator (207) is interpreted to generate next challenge to the user via client machine (202).

In an embodiment of the present invention the identification of features correlated to learning ability comprises of computing correlation for each pair of features, Selecting one of mutually correlated features, and deriving a final set of selected features after discarding mutually correlated features.

In an embodiment of the present invention generation of challenges accessed by the user is based on a user's ability to score in assessment sessions, quantified as the user's Score Quotient (SQ).

In an embodiment of the present invention Score Quotient (SQ) of the user is based on marks scored by the user over multiple assessment sessions, user's behavior across multiple fine-grained latent attributes.

In an embodiment of the present invention Score Quotient (SQ) of the user is based on latent attributes of the user comprising academic or learning dimension (LQ) and behavioral dimension (BQ).

In an embodiment of the present invention the behavioral dimension (BQ) comprises of (a) scholastic attitude or intent dimension (iQ), and test taking skills dimension (TQ).

In an embodiment of the present invention the user's Score Quotient (SQ) is projected on to the three dimensions learning (LQ), intent (iQ), and test taking skills (TQ) dimensions.

In an embodiment of the present invention a user's Score Quotient (SQ) projections are used to derive a rule-based engine for spot remediations which improves user's Score Quotient (SQ).

In an embodiment of the present invention a rule engine derived spot remediations is provided that takes forms as academic recommendations targeting learning dimension (LQ) of the user, and behavioral recommendations targeting behavioral dimension (BQ) of the user.

In an embodiment of the present invention the identification the feedback to the user is presented in the form of spot remediations which are weighted based on its impact to Score Quotient (SQ) improvement for said user.

In an embodiment of the present invention the identification the impact of feedback, on the user's Score Quotient (SQ), in the form of spot remediations is determined using
dominance analysis, and
momentum analysis.

In an embodiment of the present invention the feature's correlation with a student's user's performance Score Quotient (SQ) is determined using correlation analysis.

These and other embodiments of the present disclosure will also become readily apparent to those skilled in the art from the following detailed description of the embodiments having reference to the attached figures, the disclosure not being limited to any particular embodiments disclosed.

BRIEF DESCRIPTION OF DRAWINGS

For a better understanding of the embodiments of the systems and methods described herein, and to show more clearly how they may be carried into effect, reference will now be made, by way of example, to the accompanying drawings, wherein.

DETAILED DESCRIPTION

Figure 1:
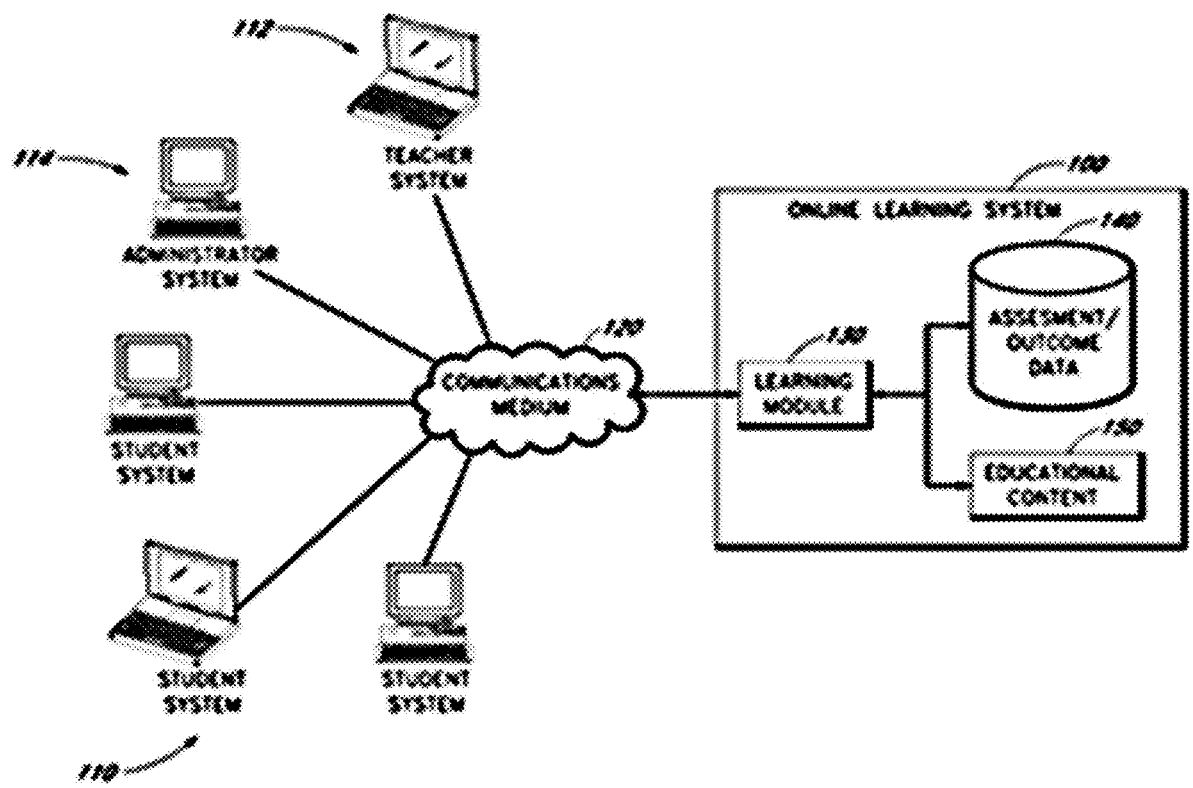
FIG. 1 illustrates a diagrammatic representation of an environment in which an existing system(s) may operate.

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention provides a self-adaptive machine and parts thereof which increases the learning power of a user by employing a novel feedback mechanism to calibrate and improve user's ability to score. It consist of following constituent parts, of which components of the invention are in bold font:

FIG. 1 illustrates a diagrammatic representation of an environment in which an existing system(s) may operate.

Here, the students (110) interact with an online learning system (100) via a communications medium (120).

Thus, Luca Anastasia Maria, "System and method for objective assessment of learning outcomes", Patent Application No: PCT/US2012/037849, Nov. 22, 2012, provides a system and method to assess learning outcomes. This system computes the learning outcome of students by comparing student response to a set of pre-defined assessment units, and based on how closely the student solutions match the assessment solution key.

In contrast, the present invention provides a system and method to continuously monitor and quantify a student's response to a series of challenges posed by a self-adapting machine and to use said quantified score to post next challenge to the user thus optimizing the ability of the user to score.

Furthermore, the present invention takes into account scholastic intent and test-taking skills of a user, in addition to academic or learning aptitude, when assessing the ability of student to score, as opposed to only using academic aptitude as existing technologies.

A student's ability to score within the purview of the present invention is quantified as their "Score Quotient" (SQ), and it not only reflects the final marks scored in test(s), but also reflects the student's behavior on multiple fine-grained latent attributes.

These latent attributes, in line with the present invention, is categorized along multiple dimensions:
(1) academic or learning dimension (LQ), and
(2) behavioural dimension (BQ) which can be further considered as comprising of the sub-categories
    (a) scholastic attitude or intent dimension (iQ)
    (b) test taking skills dimension (TQ)

Each latent attribute captures information about a student's academic learning, intent and test-taking techniques. Features are automatically categorized into LQ, iQ and TQ dimensions as follows:

LQ: denotes students' academic learning. A non-exhaustive set of features in this category include attributes such as accuracy, attempts, perfect attempts, subject accuracy imbalance, average correct difficulty level, average attempted difficulty level, among other similar features.

iQ: denotes student's scholastic attitude or intent irrespective of his knowledge. A non-exhaustive set of features in this category include attributes such as wasted attempts, time spent not attempting, too fast correct, subject swaps, stamina, gross time taken ratio to ideal time, among other similar features.

TQ: denotes students test taking ability. A non-exhaustive set of features in this category include attributes such as overtimes, overtimes correct, time spent in incorrect questions, questions marked review, questions looked, among other similar features.

In order to capture this information efficiently, each feature should be mutually exclusive and collectively exhaustive (MECE). To achieve MECE representation of features, following techniques are used:

1. Only features correlated with student's performance are considered. Each feature's correlation with students' performance is computed using correlation analysis. A correlation cut-off threshold value is used to mark a feature correlated or not. Non linearly correlated features are transformed to linearly correlated features algorithmically by applying various mathematical techniques like median pivoting.
2. Only mutually uncorrelated features should be considered. Hence, correlation for each pair of features is computed, and only one of mutually correlated features is selected in an automated fashion, and a final set of selected features is derived after discarding mutually correlated features.

Hence, a student's ability to score are interpreted via learning dimension (LQ), attitude or intent dimension (iQ), and test taking skills dimension (TQ) which are in turn, projections of the overall SQ on each respective dimension.

The SQ is defined as a student's ability to score. Therefore, it must necessarily comprise of the following characteristics:

A. Reflective: is a measure of a user (student's) potential to score based on latent attributes.
B. Predictive: is a measure of current trend in a user's student's performance.
C. Robust: refers to a single bad performance in a test or single outstanding performance in a test should not severely impact SQ proportionally.
D. Normalized: It should be normalized against test difficulty level.

In order to adhere to these characteristics, the present invention provides a system and method to compute SQ based on the following parameters:

Latent attributes: ensure that SQ is reflective of a student's inherent ability (to score), satisfying (A) above. A non-exhaustive list of such latent attributes include
- wasted attempts ratio
- perfect attempts ratio
- overtime attempts ratio
- time spent on questions not attempted
- time spent on incorrect attempts
- total time spent In order to learn the weightage of latent attributes that make up SQ, the assessment score for each user is estimated from a large volume of historical user assessment data, using machine learning techniques like regression and neural networks.

The weightage assigned to each of the latent attributes that make up SQ is derived using coefficients learned/determined during the estimation of user assessment scores.
Last tests: make SQ predictive and reflective of current potential. In a sample case scenario if normalized score is improving after each test, it's likely that student will perform better in the near future as well. In line with the present invention N last tests are used, where N is configurable satisfying (B) above.
Best tests: This makes SQ reflective and robust. In line with the present invention M best tests are used, where M is configurable, satisfying (C) above. The present invention uses, harmonic progression to decay importance of high scored tests to low scored ones.
Test score normalization: When considering the N last tests, and M best tests, test score is always normalized to test difficulty level, satisfying (D) above.

The present invention also provides a novel feedback mechanism using spot recommendations targeted specifically at positively affecting the various scholastic quotients of the user's (student's) ability to score, as this maximization effort within a constrained time span is an NP-hard optimization problem.

Particularly, each piece of feedback presented to the student is weighted on its impact to SQ improvement. When a particular feedback impacts all three dimensions of SQ, its overall impact compounds which is more than mere addition and sub-total of individual dimensions of SQ.

The SQ is projected on to the three dimensions academic (LQ), intent (iQ), and test taking skills (TQ) dimensions, by using the individual coefficients of the latent attributes that make up each dimensions.

A direct benefit of projecting SQ to LQ, iQ, and TQ is the ability to map rules, via a rule-engine, from various combinations of levels of LQ, iQ and TQ to student motivation and remediation using feedback.

In an embodiment, the present invention provides a feedback to a user (student) with SQ which projects to high LQ, high iQ, but low TQ. Since the system proposed by present invention has available an exhaustive set of features that relate to TQ, it can use the rule-engine and provide behavioral intervention in the form of granular and action-oriented feedback to the student e.g., "You spend too much time on questions where you are unsure of the subject material. Reduce that time to allow you more time overall on your test.", or "You spend too little time reading all the questions before you start attempting your test. Spend more time doing a first read so you can plan your test path better."

For another user (student) interacting with the system and having SQ composed of low LQ, but high iQ and high TQ, the system can use the rule-engine to provide a spot recommendation to push a just-in-time academic payload to the user e.g., "You require more time practicing the content material for Chapter X, in order to perform optimally". The rule engine ranks and orders from among the candidate set of potential spot recommendations, the most optimized recommendation that is projected to improve the user's score weighted against her iQ and TQ dimensions.

For instance, if a user incorrectly answered questions from two different sources i.e. chapters or concepts, a rule engine prioritizes delivering to the, user spot recommendations from the chapter where the user made more careless mistakes as opposed to, for example, the chapter where the user needs more study time to master the material. This ensures that with minimal investment of additional time spent, the user can have a larger positive impact on her overall scoring ability.

Hence, spot recommendations which constitute the backbone of the invention's feedback system can improve a user (student's) SQ by providing each user (student) with granular corrective feedback that specifically targets improvements to users LQ, iQ, and TQ either individually or in any combination permissible.

The present invention thus acts as an automated system using both hardware and software components with a micro-adaptive learning mechanism by continuous personalized feedback which improves TQ, iQ, and LQ individually, and in turn SQ.

In order to derive the impact of each piece of feedback, the present invention provides an application server that extracts a set of user-test-specific parameters from a distributed database.

The test parameters are used as input to an empirical dominance analysis to measure the dominance of each parameter driving the overall SQ of the user (student).

The system of the present invention then computes the relative test-on-test momentum of these parameters (momentum analysis), and compares it against a student's cohort based on improvement of score.

Dominance analysis and momentum analysis are used as signals by another method algorithm to tune the system to prioritize granular feedbacks by determining the impact that each piece of feedback can bring.

Thus, the present invention is directed to automated computation of SQ using distributed hardware components and software components. As mentioned above the ability to numerically quantify a student's ability to score based on measurable latent attributes of a student that can be captured via simple online interactions via a web browser and the same is one of the major features of the present invention. Thus, present invention advantageously provides for projection of SQ to LQ, iQ, TQ to clearly demonstrate a user's ability to score based on three independent dimensions of LQ, iQ, and TQ.

The existing technologies merely measure LQ of a user and cannot measure or calibrate iQ and TQ of a user, that act as a very important to guide the student to improve.

The novel feedback mechanism of the present invention provides for automated generation of user performance improvement insights.

This makes it possible to improve test taking skills and behavioral attributes of a user within an optimized time span, as compared to only focusing on academic improvement.

The academic improvement can be further prioritized by compounding its impact on behavioral and test taking skills.

One of the application(s) for the present invention is in aiding students preparing for competitive or board-level examinations.

The present invention specifically provides a user (student) with mathematically sound, numerical representation of her ability to score on any given exam, and furthermore includes providing the user with fine-grained, actionable feedback along three dimensions->LQ, iQ, TQ.

iQ and TQ dimensions are easier for a user (student) to improve on than LQ, incremental changes adopted by the user (student) along these dimensions positively impact overall SQ.

The present invention provides an ability to use SQ to provide a rank order on student aptitude and ability, enabling the user to compare standing against peers.

The present invention also provides an ability to map SQ to final attainable rank ranges in each competitive exam.

The current invention as described can track test-taking and question-answering online activity of users on web and/or mobile platforms. However, offline activity (such as students taking tests elsewhere or practicing concepts by themselves) is not captured. Capturing or, at the least, allowing for user input of such offline activity could also increase the adaptive machine's learning power to refine calibration and further improve student's ability to score.

Figure 2:
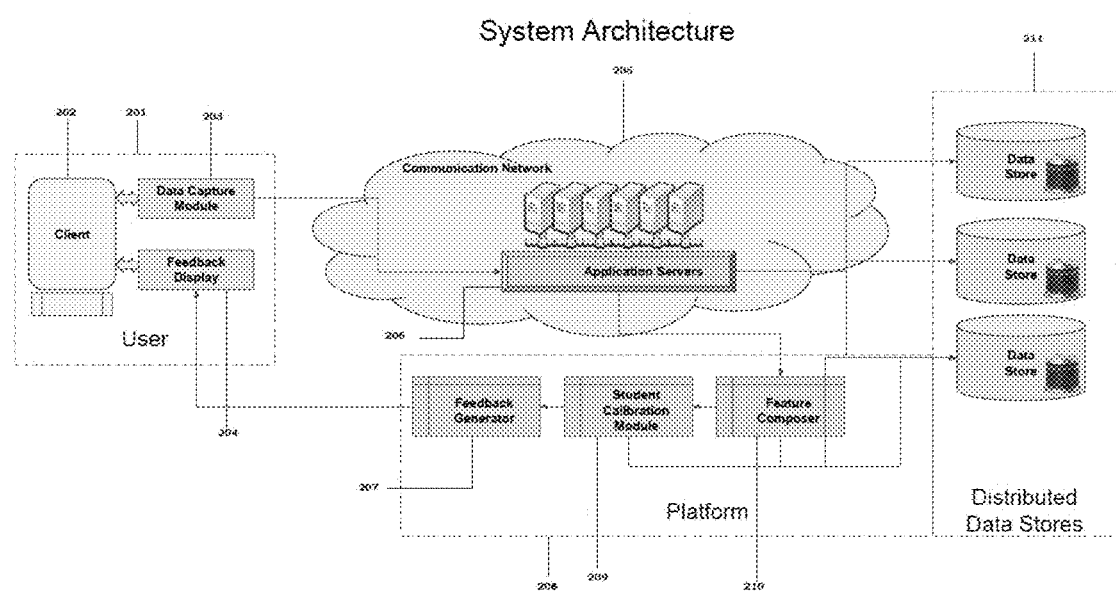
FIG. 2 illustrates an exemplary System Architecture of the present invention.

FIG. 2 illustrates an exemplary System Architecture of the present invention.

In order to achieve at least said objective, the present invention provides a client machine (202) operated by a user (201). The client machine hosts at least a Data Capture Module (203) and a Data collection module. The client machine (202) is operatively coupled with Data Capture Module (203) Feedback Display (204).

The user (201) operates the client machine (202) to access challenges displayed by the client machine. The data capture module (203) captures the response of the user to a particular challenge and sends the captured response to plurality of application servers (206) via communication network (205).

The application servers (206) host a platform (208) comprising of a feedback generator (207), student calibration module (209) and feature composer (210). The application servers (206) are operatively coupled with the platform (208).

The feature composer (210) extracts a plurality of predefined features from the captured response received from application server (206). The captured features are forwarded to calibration module (209). The output of calibration module (209) is forwarded to feedback generator (207). The feedback is forwarded to feedback display unit (204) for posing next challenge to user (201) via client device (202).

Throughout the above interaction the captured data (response) may be selectively stored temporarily and/or permanently in plurality of data stores (211). Similarly, data (response) may be retrieved from data stores (211) by application server(s) (206) and/or platform (208).

Thus as part of an online platform the present invention measures a series of attributes as a user (201) (student) interacts with the platform (208).

Such attributes within the context of the present invention are a combination of variables that can be collected from a user's client machine (202) hardware (system details, clock time, browser details, OS (Operating System) details, etc.) as well as attributes based on the user (Student) interaction signals with the client machine (202) (time to solve, sequence of solving, final answer selected, switches in answers selected, etc.).

These attributes are thereafter sent by the client data capture module (203) securely over the communication network (205) to the central application server (206). The application server (206) stores the raw attributes as well as automatically computed derived features into a distributed database (211).

Figure 3:
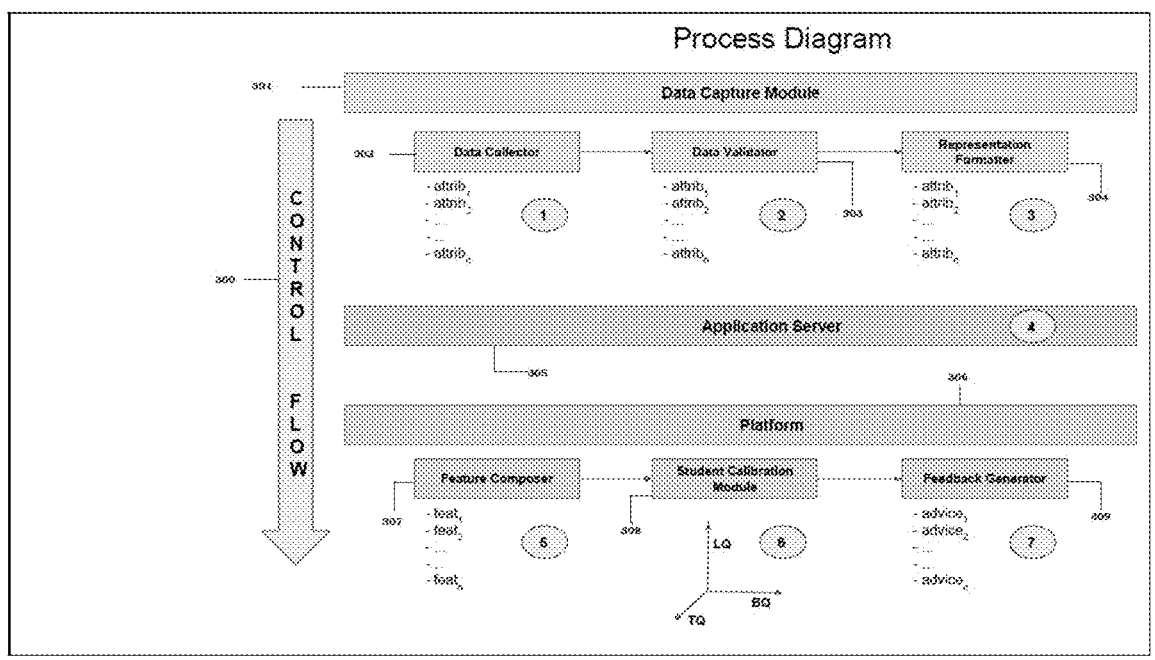
FIG. 3 illustrates an exemplary Control Flow Diagram depicting capturing and processing of response entered by user.

FIG. 3 illustrates an exemplary Control Flow Diagram depicting capturing and processing of response entered by user.

The data capture Module (301) comprises of data collector (302) that captures response of user(s) as a set of predefined attributes. The captured attributes are validated against a predefined set of rules by a data validator (303). The captured response as a set of validated attributes is formatted by a representation formatter (304).

The formatted attributes of the captured response are forwarded to application server (305) and thereafter to platform (306). The platform (306) comprises of feature composer (307) that composes the captured response as a set of features and forwards the output to calibration module (308). The calibrated response is forwarded to feedback generator module (309).

Figure 4:
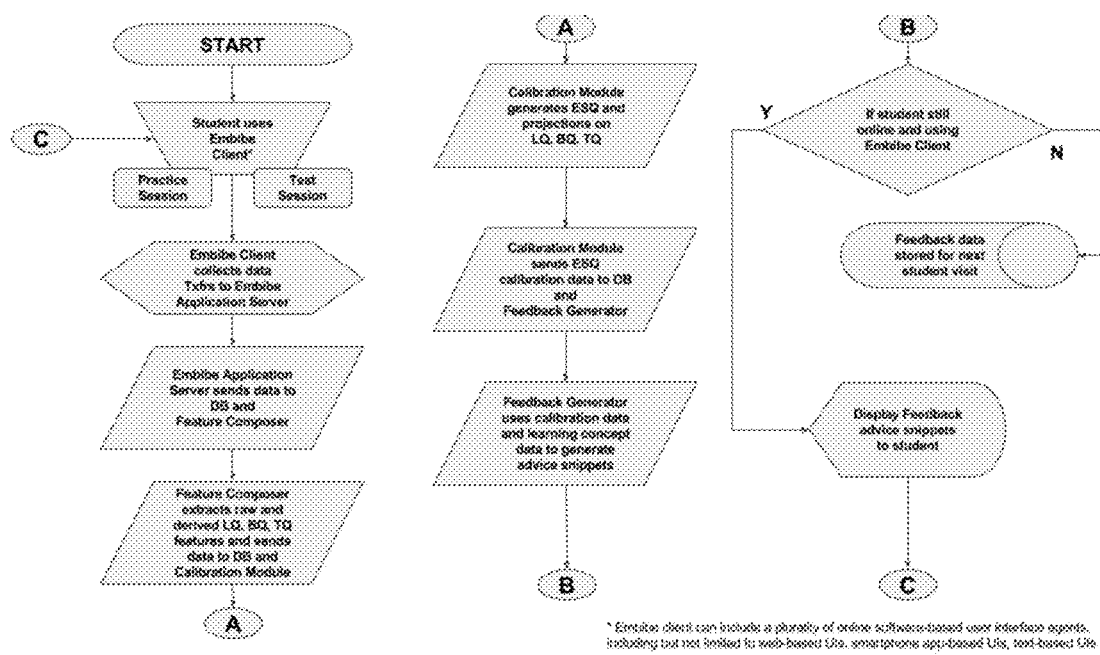
FIG. 4 illustrates a process flow diagram of an exemplary user interaction with the novel platform of the present invention.

FIG. 4 illustrates a process flow diagram of an exemplary user interaction with the novel platform of the present invention.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures. It should be appreciated that the functions, structures, elements and the protocols used in communication are irrelevant to the present disclosure. Therefore, they need not be discussed in more detail here.

Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

The features provided by the disclosed system in the present disclosure, may be wirelessly accessed remotely, in one or more embodiments, and/or through a wireless network. Such types of wireless network service providers operate and maintain the computing systems and environment, such as server system and architectures. Typically, server architecture includes the infrastructure (e.g. hardware, software, and communication lines) that offers wireless network services.

For the most part, the operations described herein are operations performed by a handset, computer or a machine in conjunction with a human operator or user that interacts with the computer or the machine. The programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein.

It will be apparent to those having ordinary skill in this art that various modifications and variations may be made to the embodiments disclosed herein, consistent with the present disclosure, without departing from the spirit and scope of the present disclosure.

Other embodiments consistent with the present disclosure will become apparent from consideration of the specification and the practice of the description disclosed herein.

What is claimed is:

1. A method for optimizing learning ability of a user, the method comprising:
   providing the user access to challenges that are displayed by a client machine;
   capturing a response of the user to a first such challenge; and
   sending the captured response to a plurality of application servers hosting a platform, wherein the platform comprises a feedback generator, a calibration module and a feature composer;
      the feature composer being configured for extracting a plurality of predefined features from the captured response and sending the captured features to the feedback generator via the calibration module;
      the calibration module being configured for generating a Score Quotient (SQ) for the user; and
      the feedback generator being configured for generating a next challenge to the user based on generating a Score (SQ) and the extracted features.

2. The method as claimed in claim 1, wherein the client machine comprises:
   a desktop computer;
   a tablet;
   a mobile device; or
   a personal computing device.

3. The method as claimed in claim 1, wherein the challenges accessed by the user are generated based on the user's ability to score in assessment sessions, quantified as the Score Quotient (SQ) of the user.

4. The method as claimed in claim 3, wherein the Score Quotient (SQ) of the user is based on one or both or:
   marks scored by the user over multiple assessment sessions, and
   the user's behavior across multiple fine-grained latent attributes.

5. The method as in claimed in claim 3, wherein the Score Quotient (SQ) of the user is based on latent attributes of the user, wherein the latent attributes comprises:
   an academic or a learning dimension (LQ) and;
   a behavioral dimension (BQ).

6. The method as claimed in claim 5, wherein, the behavioral dimension (BQ) comprises:
   a scholastic attitude or intent dimension (iQ), and
   a test taking skills dimension (TQ).

7. The method as claimed in claim 3, wherein the Score Quotient (SQ) of the user is projected onto the learning dimension (LQ), the intent dimension (iQ), and the test taking skills dimension (TQ).

8. The method as claimed in claim 7, wherein the Score Quotient (SQ) projections are used to derive a rule-based engine for spot remediations configured for improving the user's Score Quotient (SQ).

9. The method as claimed in claim 8, wherein the rule-based engine derived spot remediations takes forms, comprising:
   academic recommendations targeting the learning dimension (LQ) of the user, and
   behavioral recommendations targeting the behavioral dimension (BQ) of the user.

10. The method as claimed in claim 1, wherein the next challenge to the user is presented in the form of spot remediations, which are weighted based on its impact to the user's Score Quotient (SQ) improvement for said user.

11. The method claimed in claim 1, wherein the impact of the next challenge, on the user's Score Quotient (SQ), in the form of spot remediations is determined using:
   dominance analysis, and
   momentum analysis.

12. The method as claimed in claim 1, wherein a feature's correlation with the user's performance is determined using correlation analysis.

13. The method as claimed in claim 1, wherein the step for identifying features correlated to learning ability comprises:
   computing correlation for each pair of features,
   selecting one of mutually correlated features, and
   deriving a final set of selected features after discarding mutually correlated features.

14. An apparatus for optimizing learning ability of a user, the apparatus comprising:
   a client machine operated by the user to access challenges displayed to said user;
   a data capture module hosted by the client machine to capture a response of the user to a first such challenge, send said captured response to a plurality of application servers; and
   a platform to host said application servers, wherein said platform comprises a feedback generator, a calibration module and a feature composer,
      the feature composer being configured for extracting a plurality of predefined features from the captured response and send captured features to the feedback generator via the calibration module;
      the calibration module being configured for generating a Score Quotient (SQ) for the user; and
      the feedback generator being configured for generating a next challenge to the user via the client machine.

15. The apparatus as claimed in claim 14, wherein said apparatus is configured for performing the method of claim 1.

* * * * *